United States Patent [19]
Matsuoka

[11] Patent Number: 5,388,421
[45] Date of Patent: Feb. 14, 1995

[54] HEAT PUMP TYPE AIR CONDITIONER FOR AUTOMOTIVE VEHICLE

[75] Inventor: Takayoshi Matsuoka, Yokosuka, Japan

[73] Assignee: Nissan Motor Co., Ltd., Yokohama, Japan

[21] Appl. No.: 66,266

[22] Filed: May 25, 1993

[30] Foreign Application Priority Data

May 25, 1992 [JP] Japan .................. 4-132372

[51] Int. Cl.$^6$ ............................................. F25B 41/00
[52] U.S. Cl. ................................ 62/209; 62/90; 62/324.6
[58] Field of Search ............... 62/160, 173, 90, 209, 62/324.6

[56] References Cited

U.S. PATENT DOCUMENTS

| | | | |
|---|---|---|---|
| 3,402,564 | 9/1968 | Nussbaum | 62/173 |
| 3,469,412 | 9/1969 | Giuffre | 62/173 |
| 3,520,147 | 7/1970 | Glackman | 62/173 |

FOREIGN PATENT DOCUMENTS 2-130808 10/1990 Japan .
2-290475 11/1990 Japan .

*Primary Examiner*—William E. Wayner
*Attorney, Agent, or Firm*—Lowe, Price, LeBlanc & Becker

[57] ABSTRACT

A heat pump type air conditioner for an automotive vehicle is provided with a compressor to which an outer condenser and a inner condenser are connected through a three-way valve. The inner condenser is connected to an inner evaporator through an expansion valve. The air conditioner further includes a control unit which defines a relationship among a heating property, a physical amount according to which workload of the compressor is varied, and thermal operating condition of at least one of the inner evaporator and the inner condenser. The control unit determines the physical amount at a value from the relationship for the heating property and the detected thermal operation condition by sensors, and controls the compressor according to the determined physical amount.

11 Claims, 9 Drawing Sheets

HEAT PUMP TYPE AIR CONDITIONER FOR AUTOMOTIVE VEHICLE

BACKGROUND OF THE INVENTION

1. Field of the Invention

The present invention relates to improvements in a heat pump type air conditioner applied to an automotive vehicle.

2. Description of the Prior Art

Various heat pump type air conditioners have been proposed and put into practical use for an automotive vehicle. A typical heat pump type air conditioner is provided with a four-way valve for changing refrigerant flow in heating operation and cooling operation. During the heating operation, an outer heat exchanger functions as a heat absorber, and an inner heat exchanger functions as a heat radiator. On the other hand, during the cooling operation, the outer heat exchanger functions as a heat radiator and the inner heat exchanger functions as a heat absorber. Such a heat pump type air conditioner is disclosed, for example, in Japanese Patent Provisional Publication No. 2-290475 and Japanese Utility Model Provisional Publication No. 2-130808.

As shown in FIG. 11, with the air conditioner disclosed in Japanese Patent Provisional Publication No, 2-290475, during a heating operation, a four-way valve 2 is set as indicated by a continuous line in FIG. 11, and refrigerant is circulated as follows: A compressor 1→the four-way valve 2→a first inner heat exchanger 3→a heating heat exchanger 4→a second inner heat exchanger 5→an expansion valve 6→an outer heat exchanger 7→the four-way valve 2→a receiver 8→the compressor 1. Accordingly, the heat of the refrigerant is transmitted to air led by a blower fan 9 and used for heating a passenger compartment. The heat from an engine 10 is transmitted to the refrigerant through the heating heat exchanger 4 and further transmitted from the refrigerant to air led by a blower fan 11 for heating the passenger compartment. The heat of the air led by a fan 12 is transmitted to the refrigerant through the outer heat exchanger 7.

On the other hand, during the cooling operation, the four-way valve 2 is set as indicated by a broken line in FIG. 12 and refrigerant is circulated as follows: The compressor 1→the outer heat exchanger 7→the expansion valve 6→the second inner heat exchanger 5→the first inner heat exchanger 3→the four-way valve 2→the receiver 8→the compressor 1. Accordingly, the heat of the refrigerant discharged from the compressor 1, is radiated into the atmosphere through the outer heat exchanger 7, and the heat of air led by blower fans 9 and 11 is absorbed into the refrigerant through the first and second inner heat exchanger 3 and 5. Then, the cooled air is supplied into the passenger compartment.

With such a conventional air conditioner, the absorbed heat amount by the outer heat exchanger 7 is decreased during the heating operation under conditions such that the ambient temperature is low, the automotive vehicle is in running, or it is raining or snowing. Furthermore, if the workload of the compressor 1 is constant, the radiated heat amount from the first and second inner heat exchangers 3 and 5, which radiates the sum of the heat absorbing amount from the outer heat exchanger 7, is decreased, and the heating capacity of the air conditioner is lowered. Additionally, the lowering of the heating capacity invites frost to the heat exchanger. This increases the defrost operation and prevents a stable heating operation. Furthermore, since the conventional air conditioner is arranged such that the flow direction of the refrigerant is changed under the cooling and heating operations, it is necessary to change the design of the conduits of the outer and inner heat exchangers 7, 3, and 5 so as to secure durability relative to high temperature and high pressure.

Also, since the conventional air conditioner is arranged to generate heated air by utilizing the waste heat of the engine 10 during the heating operation, it is difficult to sufficiently heat the air if applied to a vehicle which only has a small heat source, such as in a solar car or electric vehicle.

SUMMARY OF THE INVENTION

It is an object of the present invention to provide an improved heat pump type air conditioner which improves its air-conditioning capacity by realizing a stable air-conditioning control without being effected by external conditions.

Anther object of the present invention is to provide a heat pump type air conditioner which realizes both an increase of the ambient air leading amount and the amenity of vehicle passengers.

It is a further object of the present invention to provide a heat pump type air conditioner which is suitable for an automotive vehicle and which is formed with small design changes from a conventional type.

A heat pump type air conditioner according to the present invention is for an automotive vehicle and comprises a compressor which applies workload to refrigerant. The compressor varies its workload according to a physical amount. An outer heat exchanger is connected to a refrigerant discharge side of the compressor and radiates heat of the refrigerant into ambient air. A blower leads air for air-conditioning a passenger compartment of the automotive vehicle. A heat-radiating inner heat exchanger is connected to the refrigerant discharge side of the compressor and transmits the heat of the refrigerant to the air led by the blower. An expansion valve is connected to a refrigerant outlet side of the heat-radiating inner heat exchanger. A heat-absorbing inner heat exchanger is connected to a refrigerant outlet side of the expansion valve and cools the air led by the blower by transmitting the heat of the air to the refrigerant which is supplied through the expansion valve from at least one of the outer heat exchanger and the heat-radiating inner heat exchanger. A switching valve is disposed among the refrigerant discharge side of the compressor, a refrigerant inlet side of the outer heat exchanger, and a refrigerant inlet side of the heat-radiating inner heat exchanger. The switching valve leads the refrigerant from the compressor to at least the outer heat exchanger during cooling operation and leads the refrigerant from the compressor to the heat-radiating inner heat exchanger while bypassing the outer heat exchanger during heating operation. A heating property is defined by relationship with the physical amount and thermal operating condition of at least one of the heat-radiating inner heat exchanger and the heat-absorbing inner heat exchanger. The thermal operating condition is detected by a detecting sensor. The physical amount is determined at a value from the relationship with the defined heating property and the detected thermal operating condition, and the compressor is controlled according to the determined physical amount value.

With the above-mentioned heat pump type air conditioner, during heating operation, a heat amount, which corresponds to the absorbed heat amount by the heat-absorbing inner heat exchanger and the workload of the compressor, is radiated from the heat-radiating inner heat exchanger. Accordingly, the heating capacity is improved, and it becomes possible to implement a stable control without being affected by external conditions. Furthermore, it becomes possible to control the thermal operating condition of the heat-radiating inner heat exchanger and the heat-absorbing inner heat exchanger by utilizing the heating property. This stably improves heating capacity. Additionally, since it becomes possible to efficiently implement heating operation without using an electric heater or exhaust heat from an engine, the air conditioner according to the present invention is applicable to a solar car or electric vehicle which do not have large heat sources.

BRIEF DESCRIPTION OF THE DRAWINGS

In the drawings, like reference numerals designate like parts and like elements throughout all Figures, in which.

DETAILED DESCRIPTION OF THE INVENTION

Referring to FIGS. 1 to 10, there is shown an embodiment of a heat pump type air conditioner for an automotive vehicle according to the present invention.

Figure 1:
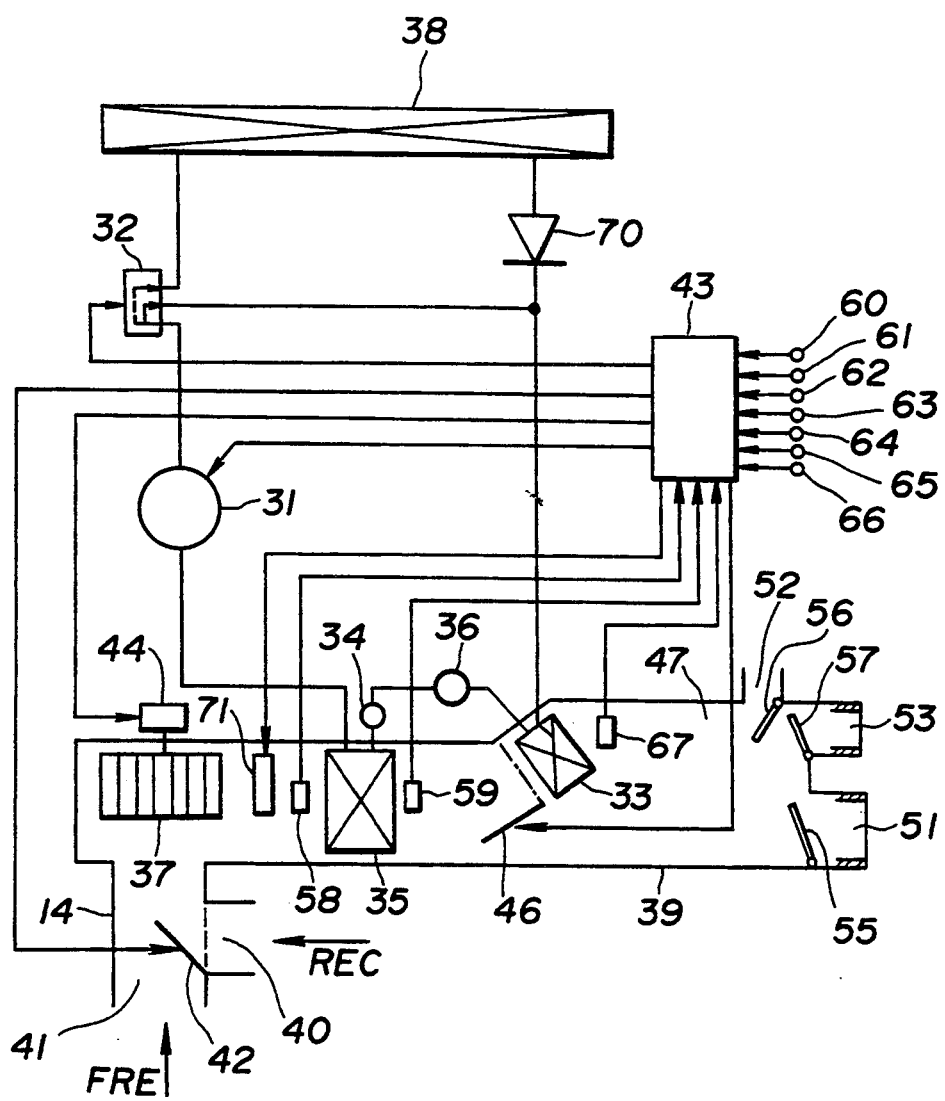
FIG. 1 is a schematic view showing a whole structure of an embodiment of a heat pump type air conditioner according to the present invention.

As shown in FIG. 1, a compressor 31 is disposed outside of a passenger compartment of the automotive vehicle, such as in an engine room. The compressor 31 is of a type in which input power is directly variable, such as, of an electric drive type or hydraulic drive type. An outer heat exchanger 38 and a heat-radiating inner heat exchanger 33 are connected to a discharge side of the compressor 31 through a three-way valve 32. The outer heat exchanger 38 is disposed outside of the passenger compartment and serves as an outer condenser for radiating heat of the refrigerant discharged from the compressor 31 into the atmosphere. The heat-radiating inner heat exchanger 33 is disposed in a duct 39 which is located at a front portion of the passenger compartment, such as, a back side of an instrument panel and which duct 39 serves as a main body of the air conditioner. The heat-radiating inner heat exchanger 33 serves as an inner condenser of a radiating type which radiates heat of the refrigerant discharged from the compressor 31 to air led by a blower fan 37 functioning as a blowing means. The three-way valve 32 during a heating operation is set at a state shown by a continuous line in FIG. 1 and fluidly communicates the discharge side of the compressor 31 and a refrigerant inlet of the heat-radiating inner heat exchanger 33. On the other hand, the three-way valve 32 during the cooling operation is set at a state shown by a broken line in FIG. 1 and fluidly communicates the discharge side of the compressor 31 and the refrigerant inlet of the outer heat exchanger 38. The refrigerant outlet of the outer heat exchanger 38 is connected to the refrigerant inlet of the heat-radiating inner heat exchanger 33 through a one-way valve 70. The one-way valve 70 is arranged to allow refrigerant to flow from the outer heat exchanger 38 to the heat-radiating inner heat exchanger 33 and to prevent the refrigerant from flowing from the heat-radiating inner heat exchanger 33 to the outer heat exchanger 38.

The refrigerant outlet of the heat-radiating inner heat exchanger 33 is connected to a refrigerant inlet of a heat-absorbing inner heat exchanger 35 through a receiver 36 and an expansion valve 34. The expansion valve 34 is disposed outside of the passenger compartment and serves as an expansion means for atomizing liquid refrigerant by the adiabatic expansion. The heat-absorbing inner heat exchanger 35 is disposed at an upstream side of the heat-radiating inner heat exchanger 33 in the duct 39. The heat-absorbing inner heat exchanger 35 serves as an evaporator of an endothermic type by which the heat of-the air led by the blower fan 37 is absorbed into the refrigerant supplied from at least one of the outer heat exchanger 38 and the heat-radiating inner heat exchanger 33 through the expansion valve 34. The refrigerant outlet of the heat-absorbing inner heat exchanger 35 is connected to the inlet of the compressor 31.

In the duct 39, an inner air inlet 40, which leads the air into the passenger compartment, and an outer air inlet 41, which leads outside air due to the wind pressure under the vehicle cruising condition, are disposed upstream of the heat-absorbing inner heat exchanger 35. An intake door 42, which properly mixes the air from the inner air inlet 40 and the outer air inlet 41 by changing its opening degree $X_{dsc}$, is disposed at a dividing portion of the inner and outer air inlets 40 and 41 in the duct 39. The blower fan 37 is rotated by a blower fan motor 44 which is controlled by a control unit 43. The blower fan 37 is disposed downstream of the inner and outer air inlets 40 and 41 and upstream of the heat-absorbing inner heat exchanger 35 in the duct 39.

An air mixing door 46 is disposed upstream of the heat-radiating inner heat exchanger 33 and downstream of the heat-absorbing inner heat exchanger 35 in the duct 39. The air mixing door 46 is driven by an actuator (not shown) controlled by the control unit 43 so as to change the rate of the flow amounts between cool air and hot air, wherein the cool air is air which bypasses the heat-radiating inner heat exchanger 33 and the hot air is air which passes through the heat-radiating inner heat exchanger 33. The opening degree $X_{dsc}$ of the air mixing door 46 is defined as follows: When the air mixing door 46 is located at a position indicated by a long and short dash line in FIG. 1, that is, when the rate of the cool air is 100%, the opening degree $X_{dsc}$ is defined as 0% (full close condition). When the air mixing door 46 is located at a position indicated by a continuous line in FIG. 1, that is, when the rate of the hot air is 100%, the opening degree $X_{dsc}$ is defined as 100% (full open condition).

In order to further improve the mixing of cool air and hot air, an air mixing chamber 47 is disposed downstream of the heat-radiating inner heat exchanger 33 in the duct 39. The air mixing chamber 47 has a ventilator outlet 51 for feeding the conditioned air toward an upper side of a vehicle passenger (not shown), a foot outlet 52 for feeding the conditioned air toward a foot portion of the vehicle passenger, and a defroster outlet 53 for feeding the conditioned air toward a front glass (not shown). A ventilator door 55, a foot door 56, and a defroster door 57 are disposed in the air mixing chamber 47. The ventilator door 55 is arranged to open and close the ventilator outlet 51 by means of a ventilator door actuator (not shown) controlled by the control unit 43. The foot door 56 is arranged to open and close the foot outlet 52 by means of the foot door actuator (not shown) controlled by the control unit 43. The defroster door 57 is arranged to open and close the defroster outlet 53 by means of a defroster door actuator (not shown) controlled by the control unit 43.

The control unit 43 is connected to thermal information input means, such as an inlet air temperature sensor 58 for the heat-absorbing inner heat exchanger 35, an outlet air temperature sensor 59 for the heat-absorbing inner heat exchanger 35, a blowout air temperature sensor 60 of the ventilator outlet 51, a solar radiation sensor 61, an outer air (ambient) temperature sensor 62, a room air temperature sensor 63, a room air temperature setting device 64, an outlet-port mode switch 65, a blower fan switch 66, and an outlet air temperature sensor 67 of the heat-radiating inner heat exchanger 33.

The inlet air temperature sensor 58 detects an inlet air temperature $T_{suc}$ and sends a signal indicative of the inlet air temperature $T_{suc}$ to the control unit 43. The outlet air temperature sensor 59 detects an outlet air temperature $T_{out}$ and sends a signal indicative of the outlet air temperature $T_{out}$ to the control unit 43. The outlet air temperature sensor 67 detects an outlet air temperature $T_y$ and sends a signal indicative of the outlet air temperature $T_y$ to the control unit 43. The blowout air temperature sensor 60 detects a ventilator outlet air temperature $T_{vent}$ and sends a signal indicative of the ventilator outlet air temperature $T_{vent}$ to the control unit 43. The solar radiation sensor 61 detects a solar radiation amount $Q_{sun}$ to the vehicle and sends a signal indicative of the solar radiation amount $Q_{sun}$ to the control unit 43. The outer air temperature sensor 62 detects an outer air temperature $T_{amb}$ and sends a signal indicative of the outer air temperature $T_{amb}$ to the control unit 43. The room air temperature sensor 63 detects a room air temperature $T_{room}$ and sends a signal indicative of the room air temperature $T_{room}$ to the control unit 43. A signal indicative of a preset room temperature $T_{ptc}$ is sent to the control unit 43 from the room temperature setting device 64. The control unit 43 calculates target air-conditioning factors such as the air mixing door opening degree $X_{dsc}$, an input value $W_{comp}$ of the compressor 31, an air flow rate $V_{eva}$ passing through the second inner heat exchanger 35 and a target conditioned air temperature $T_{of}$, according to the above-mentioned thermal information. Furthermore, on the basis of the calculated values, the control unit 43 controls the compressor 31, the blower fan motor 44, the air-mixing door actuator, the return door actuator, the ventilator door actuator, the foot door actuator, and the defroster door actuator, so as to keep the target air-condition factors to the calculated value.

In the heat pump type air conditioner according to the present invention, switching between the cooling and heating operations is implemented in such a manner that the control unit 43 controls the switching of the three-way valve 32 according to a preset temperature memorized in the control unit 43. The preset temperature is defined to be a temperature at which a target conditioned air temperature $T_{of}$ according to the thermal information generally corresponds, to a boundary temperature at which window-clouding does not occur due to the relationship between the detected room temperature $T_{room}$ and the ambient temperature $T_{amb}$.

During the heating operation, the three-way valve 32 is switched as indicated by a continuous line in FIG. 1, and the refrigerant is circulated as follows: The compressor 31→the three-way valve 32→the heat-radiating inner heat exchanger 33→the receiver 36→the expansion valve 34→the heat-absorbing inner heat exchanger 35→the compressor 31. Accordingly, the air led by the blower fan 37 or by ram pressure during vehicle cruising is heated by the refrigerant passing through the heat-radiating inner heat exchanger 33. The air led by the blower fan 37 or by ram pressure during vehicle cruising is cooled by the refrigerant passing through the heat-absorbing inner heat exchanger 35.

On the other hand, during the cooling operation, the three-way valve 32 is switched as indicated by a dotted line in FIG. 1, and the refrigerant in the system is circulated as follows: The compressor 31→the three-way valve 32→the outer heat exchanger 38→the one-way valve 70→the heat-radiating inner heat exchanger 33→the receiver 36→the expansion valve 34→the heat-absorbing inner heat exchanger 35→the compressor 31. Accordingly, the outer heat exchanger 38 transmits the heat of the refrigerant discharged from the compressor 31 into the atmosphere. Furthermore, the remaining heat of the refrigerant is transmitted to the air led by the blower fan 37 or by the ram pressure during vehicle cruising through the heat-radiating inner heat exchanger 33. The heat-absorbing inner heat exchanger 35 transmits the heat of the air led by the blower fan 37 or by the ram pressure during vehicle running to the refrigerant. Therefore, the air passing through the heat-radiating inner heat exchanger 33 is heated and the air passing through the heat-absorbing inner heat exchanger 35 is cooled.

That is to say, during the heating operation, the amount of the absorbed heat by the heat-absorbing inner heat exchanger 35 and the workload corresponding to the real input value $W_{comp}$ of the compressor 31 are radiated from the heat-radiating inner heat exchanger 33 after starting of the compressor 31. Accordingly, the air whose temperature is higher than the inlet air temperature $T_{suc}$ of the heat-absorbing inner heat exchanger air temperature $T_{suc}$ of the heat-absorbing inner heat exchanger 35 is fed to the passenger compartment. That is to say, with the lapse of operating period, the inlet air temperature $T_{suc}$ is increased and the real input value $W_{comp}$ of the compressor 31 is increased due to control of the intake door 42. Accordingly, the passenger compartment is accelerately heated. In other words, with the heat pump type air conditioner according to the present invention, it becomes possible to continuously implement the heating operation without being affected by the ambient air temperature $T_{amb}$. Further, the change of the workload of the compressor 31 has a direct effect on the change of the outlet air temperature without being affected by the ambient air temperature or the cruising condition of the vehicle. In addition, during heating operation, dehumidifying operation (cooling operation) is always implemented at the heat-absorbing inner heat exchanger 35. Accordingly, the dehumidifying temperature control is stably realized. Since the air fed to the heat-absorbing inner heat exchanger 35 is fed to the heat-radiating inner heat exchanger 33, the efficiency of the compressor 31 is kept optimum in a manner to determine the real input value $W_{comp}$ of the compressor 31 within a range where freezing of the heat-absorbing inner heat exchanger 35 does not occur relative to the heat load of the air fed to the heat-absorbing inner heat exchanger 35.

On the other hand, the control unit 43 functions as a means for defining the heating property which is represented by the correlation between the physical amount by which the workload is varied and at least one of the cooling conditions of the heat-absorbing inner heat exchanger 35 and the heating condition of the heat-radiating inner heat exchanger 33.

The cooling condition of the heat-absorbing inner heat exchanger 35 is judged from the outlet air temperature $T_{out}$ detected by the outlet air temperature sensor 59 of the heat-absorbing inner heat exchanger 35. The heating condition of the heat-radiating inner heat exchanger 33 is judged from the outlet air temperature $T_v$ of the outlet air temperature sensor 67 for the heat-radiating inner heat exchanger 33. Accordingly, the outlet air temperature sensors 59 and 67 function as a means for detecting at least one of the cooling conditions of the heat-absorbing inner heat exchanger 35 and the heating condition of the heat-radiating inner heat exchanger 33 (thermal operating condition).

The control unit 43 functions as a means for controlling the compressor 31 by determining the physical amount by which the workload of the compressor 31 is varied according to the relationship between the heating property and the detected value by the outlet air temperature sensors 56 and 67. More particularly, in the event that the ambient air is sucked into the duct 39 during the heating operation, the control unit 43, functioning as a compressor control means, determines the physical amount such that the change of the outlet air temperature $T_v$, which is representative of the thermal operating condition of the heat-radiating inner heat exchanger 33, becomes almost zero according to the relationship between the heating properly and the detected result.

The control unit 43 implements a switching control of the intake damper 42. That is, the control unit 43 and the intake damper 42 function as a means for variably controlling the inlet air temperature $T_{suc}$ of the heat-absorbing inner heat exchanger 35. More particularly, in this embodiment, the inlet air temperature Tsuc of the heat-absorbing inner heat exchanger 35 is variably adjusted at the target temperature by means of the control of the intake damper 42.

During the heating operation, the heat-radiating inner heat exchanger 33 and the heat-absorbing inner heat exchanger 35 are used without using the outer heat exchanger 38. Since the heat-radiating inner heat exchanger 33 is cooled by the conditioned air cooled by the heat-absorbing inner heat exchanger 35, the operating condition of the heat-radiating inner heat exchanger 35 is affected by the cooling condition of the heat-absorbing inner heat exchanger 35. The cooling condition of the heat-absorbing inner heat exchanger 35 is dependent on the heat-load condition of the air flowing into the heat-absorbing inner heat exchanger 35 such as temperature, humidity and air flow rate, and the operating condition of the compressor 31, such as rotating speed, discharge amount and the like.

Accordingly, the heating property of the air conditioner according to the present invention is represented by the heat-load of the air fed to the heat-absorbing inner heat exchanger 35 and the operating condition of the compressor 31.

Figure 2:
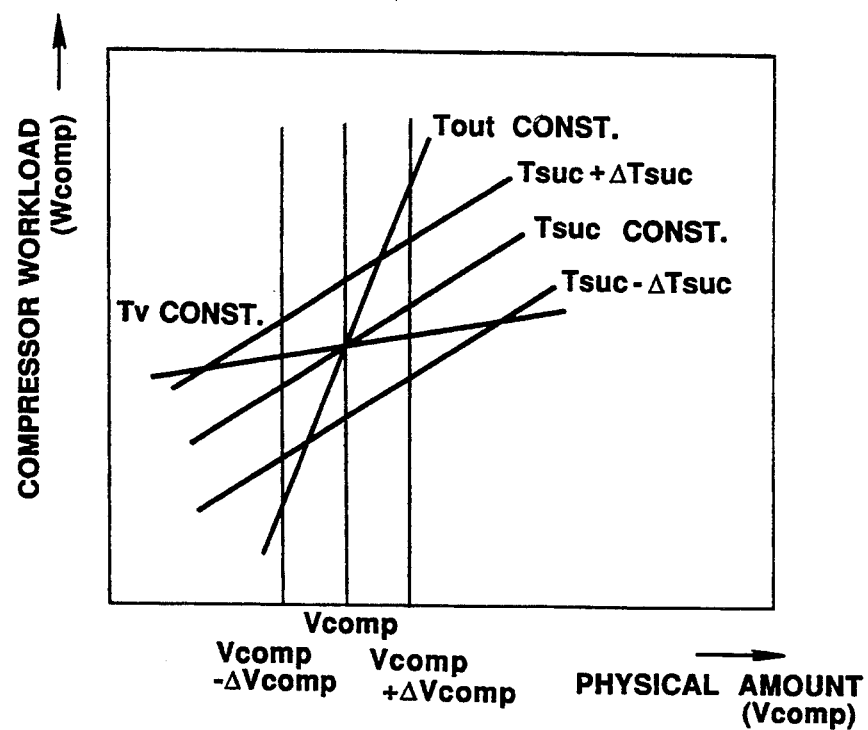
FIGS. 2 to 6 are graphs which show the heating property of the embodiment of FIG. 1.

FIG. 2 shows a heating property of the embodiment according to the present invention. In FIG. 2, a horizontal axis represents a physical amount $V_{comp}$ by which the rotating speed and the discharge amount indicative of the workload of the compressor 31 are variably controlled. A vertical axis represents the workload $W_{comp}$ of the compressor 31. Accordingly, FIG. 2 shows a change of the outlet air temperature $T_v$ and the outlet air temperature $T_{out}$, which are led from the workload $W_{comp}$ of the compressor 31 or ventilator outlet air temperature $T_{vent}$ relative to the physical amount $V_{comp}$ and the inlet air temperature $T_{suc}$ of the heat-absorbing inner heat exchanger 35.

Figure 3:
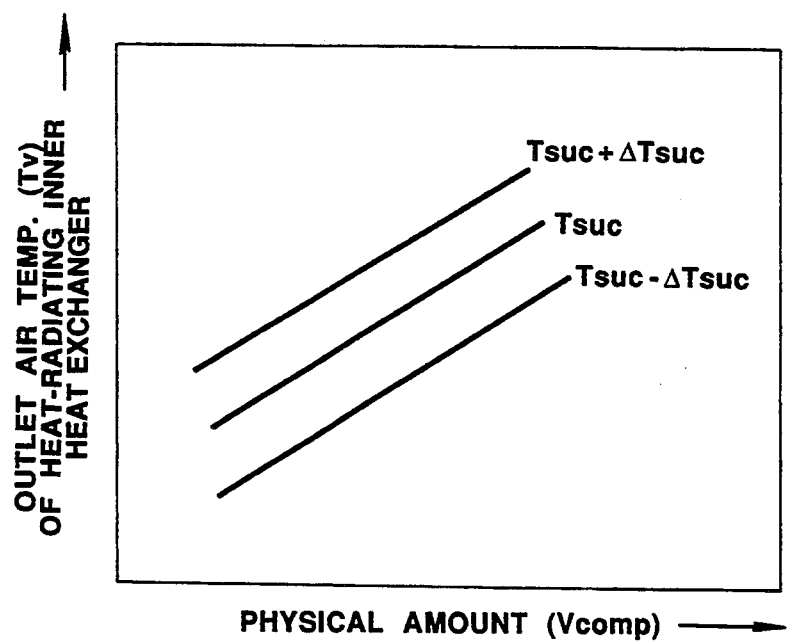
Figure 4:
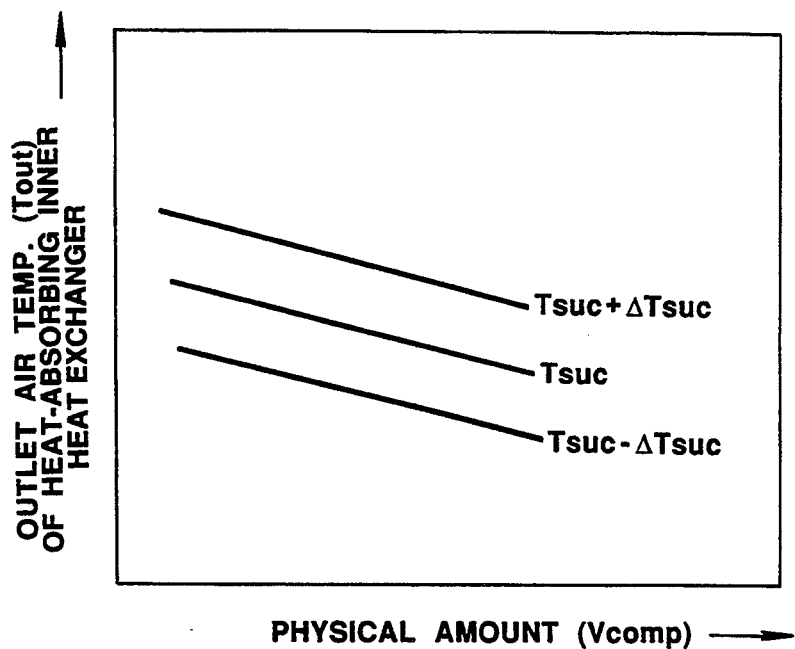

FIGS. 3 and 4 show changes in the outlet air temperature $T_v$ of the heat-radiating inner heat exchanger 33 and the outlet air temperature $T_{out}$ of the heat-absorbing inner heat exchanger 35 under a condition where the inlet air temperature $T_{suc}$ of the heat-absorbing inner heat exchanger 35 is fixed (constant) and the physical mount $V_{comp}$ is changed. As shown in FIGS. 3 and 4, the changes of the outlet air temperature $T_v$ of the heat-radiating inner heat exchanger 33 and the outlet air temperature $T_{out}$ of the heat-absorbing inner heat exchanger 35 are in proportion with the change of the physical amount $V_{comp}$ even if the inlet air temperature $T_v$ of the heat-radiating inner heat exchanger 33 takes different values. Accordingly, it becomes possible to represent the respective change amounts $\Delta T_v$ and $\Delta T_{out}$ of the outlet air temperature $T_v$ of the heat-radiating inner heat exchanger 33 and the outlet air temperature $T_{out}$ of the heat-absorbing inner heat exchanger 35 by using the micro-change amount $\Delta V_{comp}$ of the physical amount $V_{comp}$ as follows:

$$\Delta T_v = A11 \Delta V_{comp} \tag{1}$$

$$\Delta T_{out} = A21 \Delta V_{comp} \tag{2}$$

Figure 5:
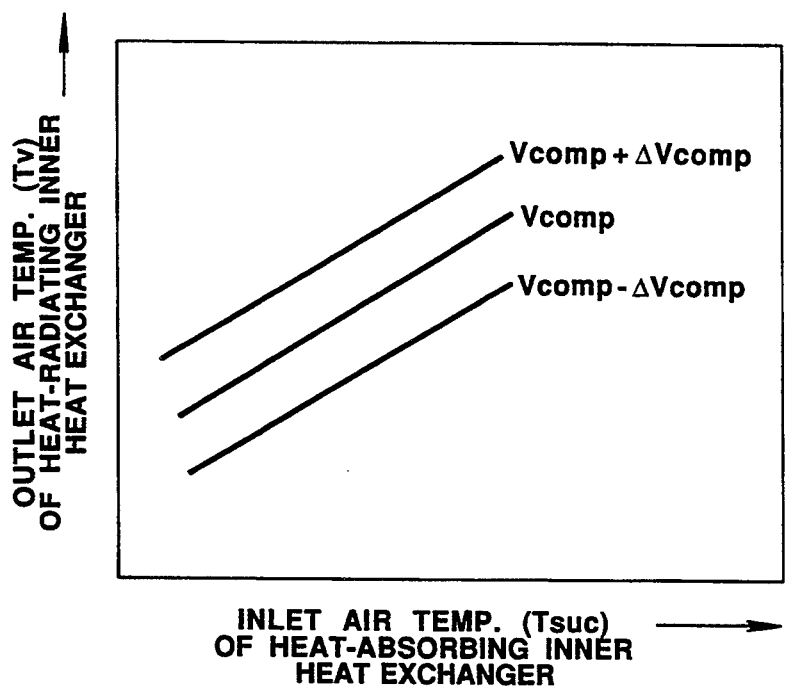
Figure 6:
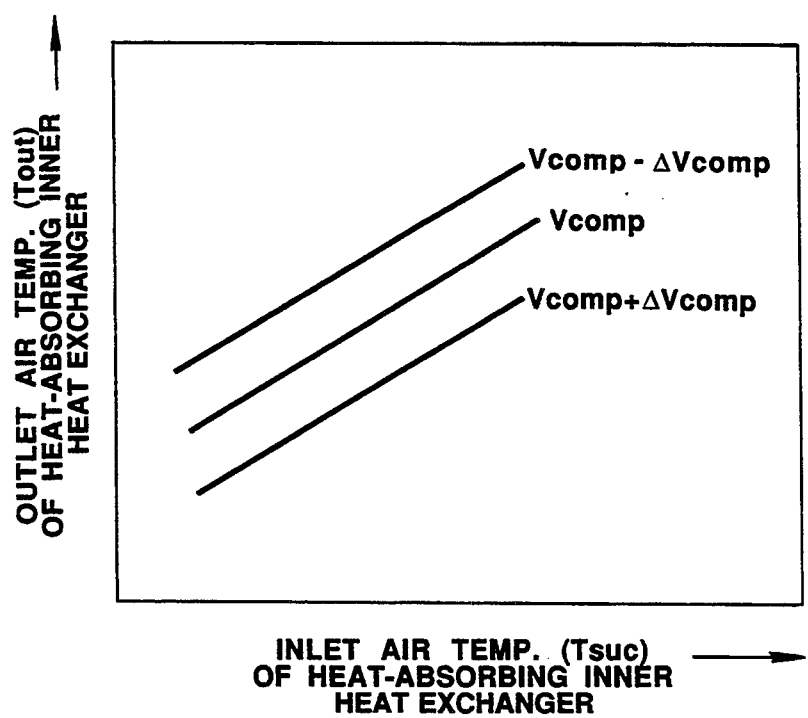

On the other hand, FIGS. 5 and 6 show changes in the outlet air temperature $T_v$ and $T_{out}$ under conditions where the physical amount $V_{comp}$ is fixed (constant) and the inlet air temperature $T_{suc}$ is changed. As is similar to the case shown in FIGS. 3 and 4, the changes in the outlet air temperature $T_v$ and $T_{out}$ is varied with the same rate relative to the inlet air temperature $T_{suc}$ even if the physical amount $V_{comp}$ takes different values. Accordingly, the change amounts $\Delta T_v$ and $\Delta T_{out}$ relative to micro-change amount $\Delta T_{suc}$ are expressed as follows:

$$\Delta T_v = A12 \Delta T_{suc} \tag{3}$$

$$\Delta T_{out} = A22 \Delta T_{suc} \tag{4}$$

Thus, by using the equations (1)–(4) which are obtained on the basis of the experimental results, the change amount $\Delta T_v$ and $\Delta T_{out}$, under conditions where the physical amount $V_{comp}$ and the inlet air temperature $T_{suc}$ are simultaneously changed, are expressed as follows:

$$\Delta T_v = A11 \Delta V_{comp} + A12 \Delta T_{suc} \tag{5}$$

$$\Delta T_{out} = A21 \Delta V_{comp} + A22 \Delta T_{suc} \tag{6}$$

Furthermore, it is acknowledged that the variations $\Delta T_v$ and $\Delta T_{out}$, which are varied due to the micro-change of the physical amount $V_{comp}$ and the inlet air temperature $T_{suc}$ in FIG. 2, correspond with that experimental result.

Accordingly, if equations (1)-(6) are memorized in the control unit 43, the temperature control is implemented so as to set the passenger compartment at a desired air-conditioned state while satisfying one of conditions, such as the condition that the outlet air temperature (ventilator outlet air temperature) $T_v$ of the heat-radiating inner heat exchanger 35 is constant, constant condition that the inlet air temperature $T_{suc}$ of the heat-absorbing inner heat exchanger 35 is constant, and the condition that the compressor workload $W_{comp}$ is constant. This temperature control is applicable in the case where the ambient air leading switch is turned on or the case where an energy saving operation is implemented.

It will be noted that the temperature control may be implemented on the basis of a table in which changes in the outlet air temperatures $T_v$ and $T_{out}$ are memorized so as to correspond to the micro-changes of the physical amount $V_{comp}$ and the inlet air temperature $T_{suc}$, instead of the equations (1)-(6).

Figure 7:
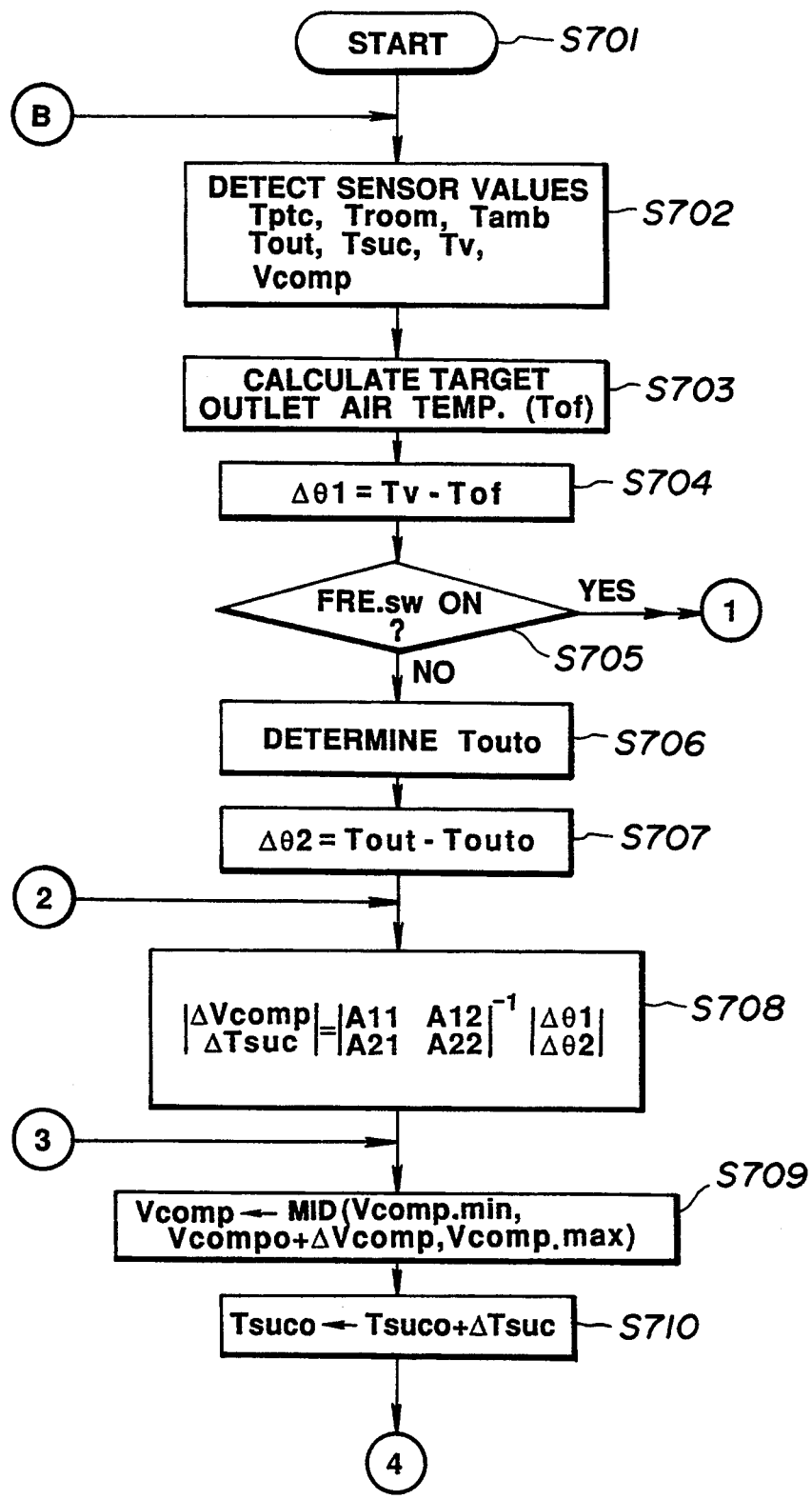
FIGS. 7 to 9 are flow charts of a temperature control of the embodiment of FIG. 1 during a heating operation.
Figure 8:
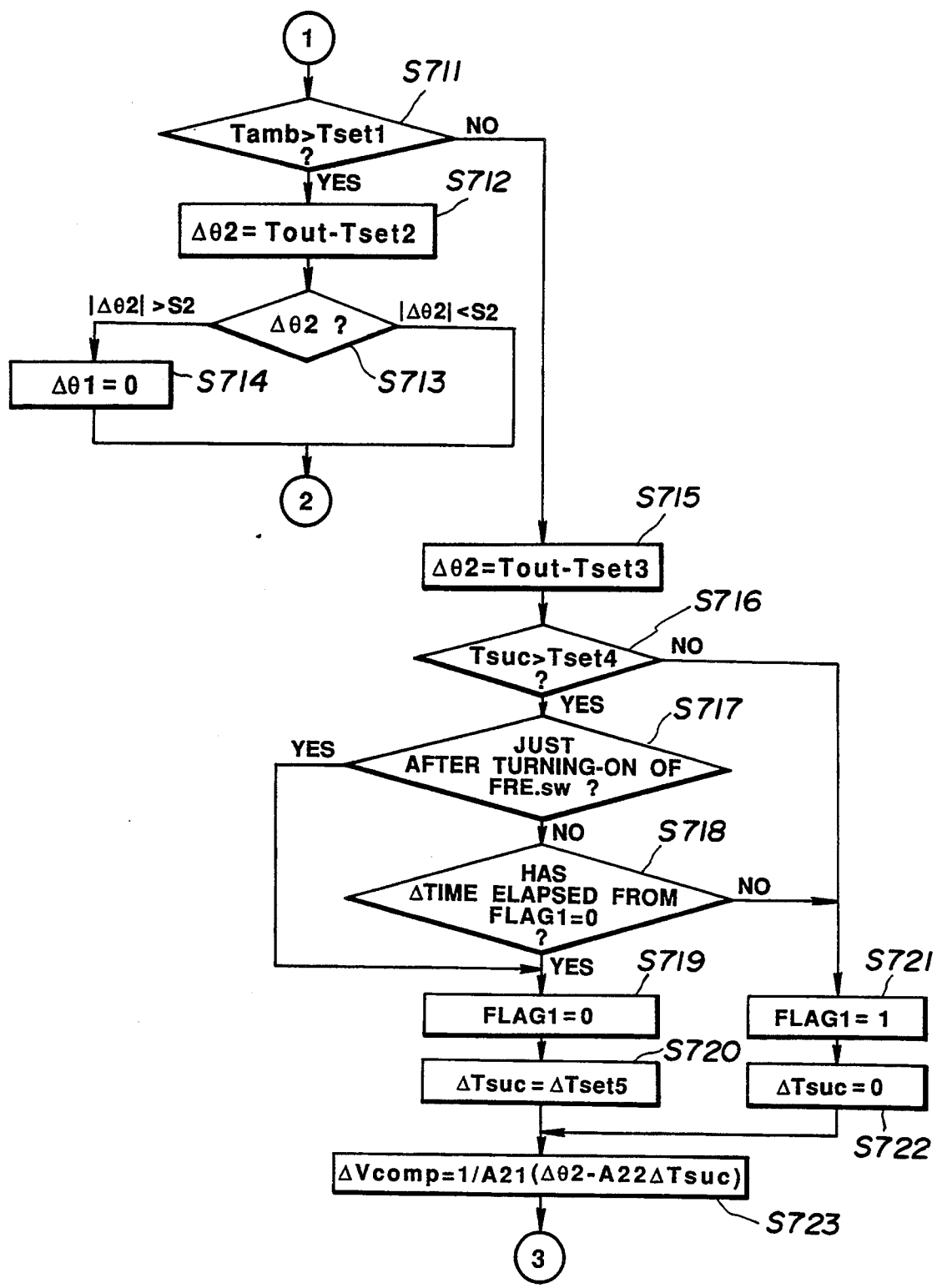

FIG. 7 shows a flow chart for a temperature control during the heating operation where the heating property mentioned above is applied.

In a step S701, the temperature control is started. Following this, in step S702, the respective sensors output the respective outputs to the control unit 43. The room temperature preset device 64 outputs the signal indicative of the setting temperature $T_{ptc}$ in the passenger compartment. The solar sensor 61 outputs the signal indicative of the solar radiation amount $Q_{sun}$. The compartment temperature sensor 63 outputs the signal indicative of the compartment temperature $T_{room}$. The ambient temperature sensor 62 outputs the signal indicative of the ambient air temperature $T_{amb}$. The air temperature sensor 59 outputs the signal indicative of the outlet air temperature $T_{out}$ of the heat-absorbing inner heat exchanger 35. The air temperature sensor 58 outputs the signal indicative of the inlet air temperature $T_{suc}$ of the heat-absorbing inner heat exchanger 35. The air temperature sensor 67 outputs the signal indicative of the outlet air temperature $T_v$ of the heat-radiating inner heat exchanger 33. A rotation speed sensor 71 for the blower fan outputs a signal indicative of a rotation speed $V_{fan}$ of the blower fan 37. A physical amount detecting sensor 73 outputs a signal indicative of the physical amount $V_{comp}$ by which the workload of the compressor 31 is changed ($V_{comp}$ is a physical amount indicative of the workload of the compressor 31). The discharge amount from the compressor 31 is increased in proportion to the increase of the physical amount $V_{comp}$, and the workload $W_{comp}$ of the compressor 31 is similarly increased. In a step S703, the target outlet air temperature $T_{of}$ is calculated as a target conditioned-air temperature on the basis of the sensor outputs.

In step S704, a difference $\Delta\theta 1$ between the outlet air temperature $T_v$ of the heat-absorbing inner heat exchanger 35 and the target outlet air temperature $T_{of}$ is calculated. In a step S705, it is judged whether the ambient air leading switch is turned on or not. When the ambient air leading switch is turned on, the program proceeds to a step S711 shown in FIG. 8. When the ambient air leading switch is turned off, the program proceeds to a step S706.

In step S706, a target value $T_{outo}$ of the cooling temperature by the heat-absorbing inner heat exchanger 35 is determined. The target value $T_{outo}$ is determined according to the solar radiation amount, the heat load to the automotive vehicle, and the ventilated air flow rate.

In step S707, a difference $\Delta\theta 2$ between the outlet air temperature $T_{out}$ of the heat-absorbing inner heat exchanger 35 and the target value $T_{outo}$ determined in step S706 is calculated.

In step S708, the micro-change amount $\Delta V_{comp}$ of the physical amount $V_{comp}$ and the micro-change amount $\Delta T_{suc}$ of the inlet air temperature $T_{suc}$ are calculated by means that the differences $\Delta\theta 1$ and $\Delta\theta 2$ substituted into the equation which shows the heating property of the air conditioner according to the present invention.

In step S709, the physical amount $V_{comp}$ is determined on the basis of the micro-change amount which is calculated in the step S708. Such a determination is implemented while it is judged whether or not the physical amount $V_{comp}$ is within the range from the minimum value $V_{comp.min}$ to the maximum value $V_{comp.max}$. Accordingly, the compressor 31 is effectively operated.

Figure 9:
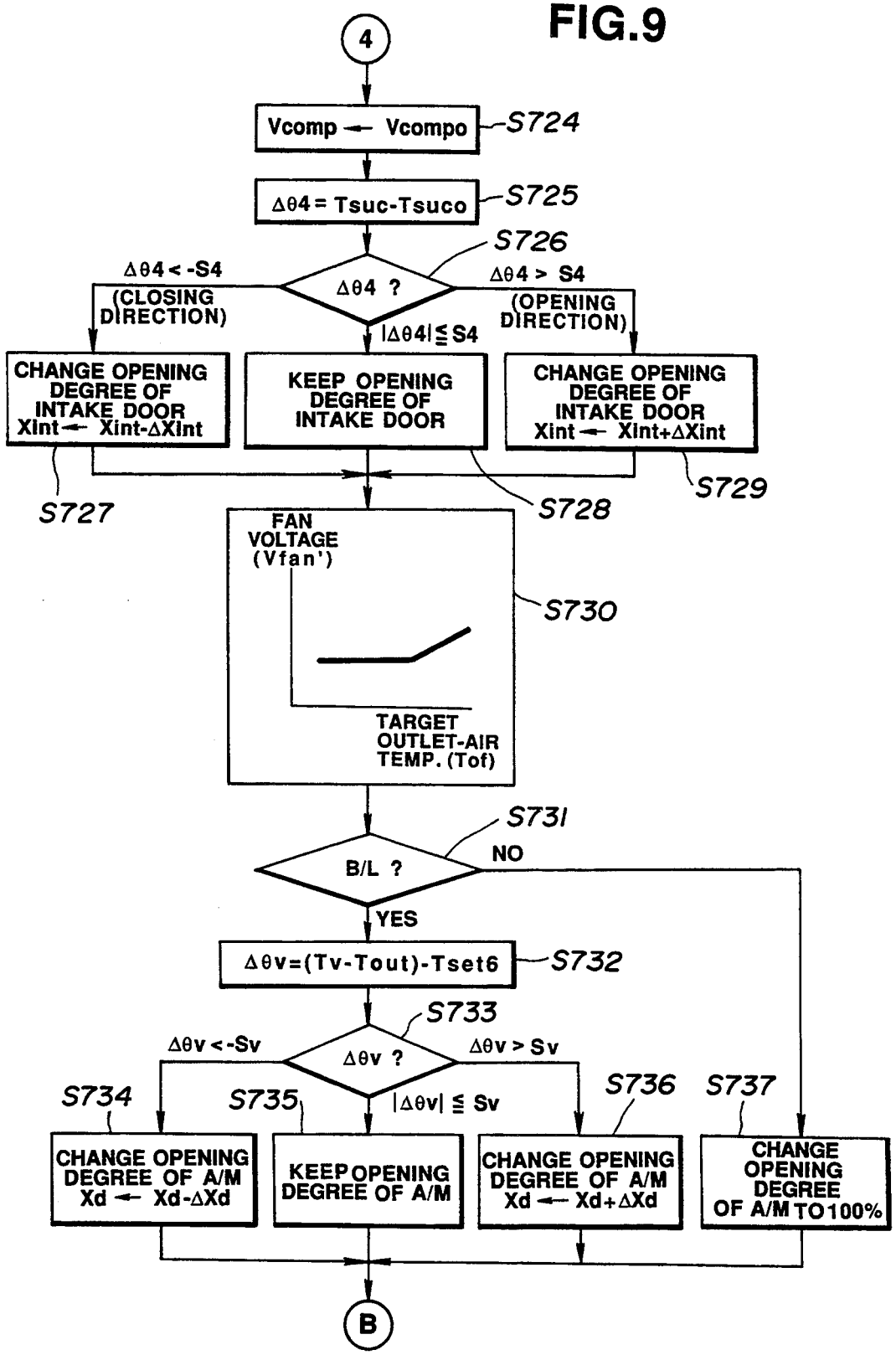
Figure 10:
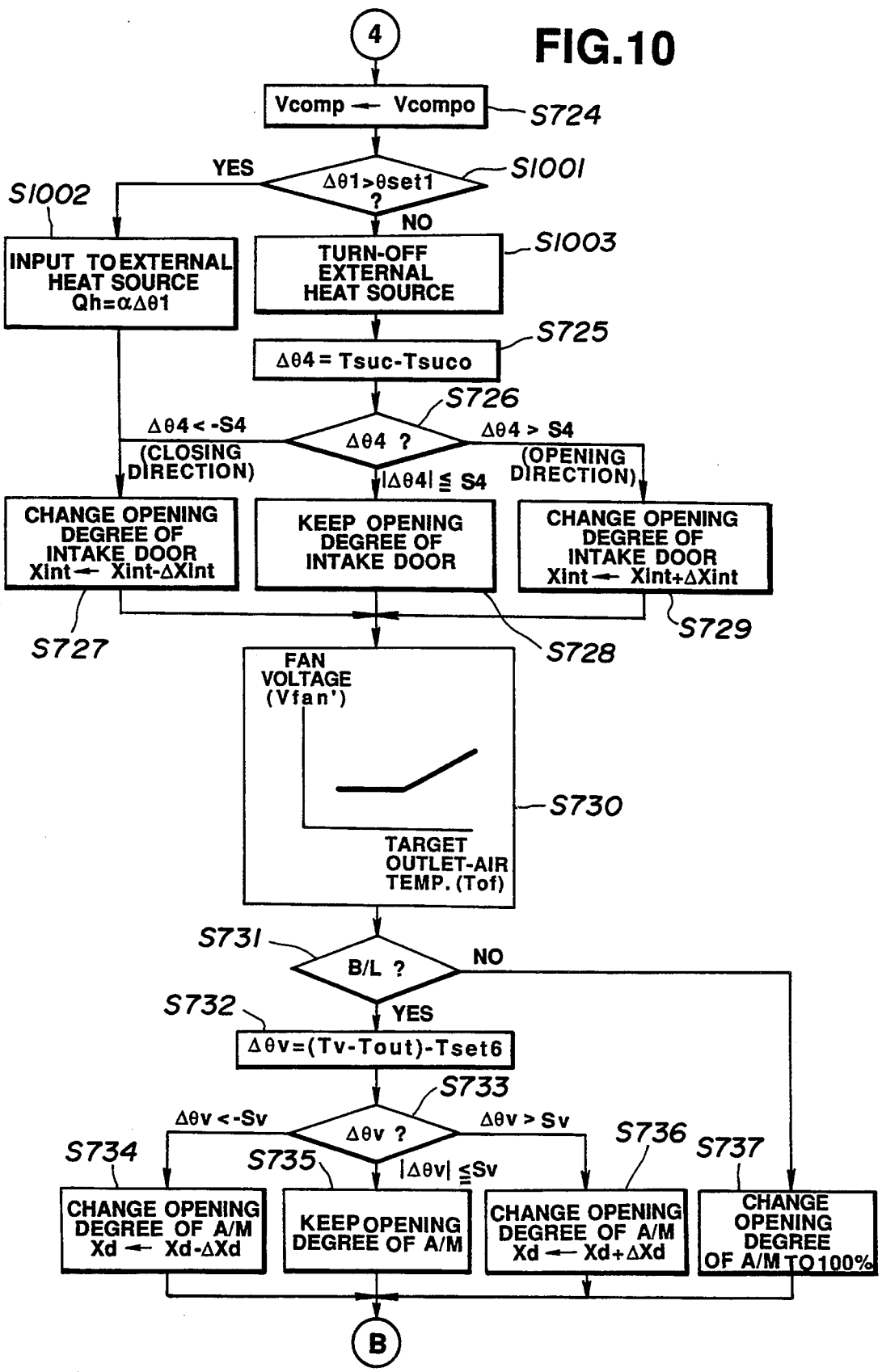
FIG. 10 is a flow chart of a temperature control corresponding to that of FIG. 9.
Figure 11:
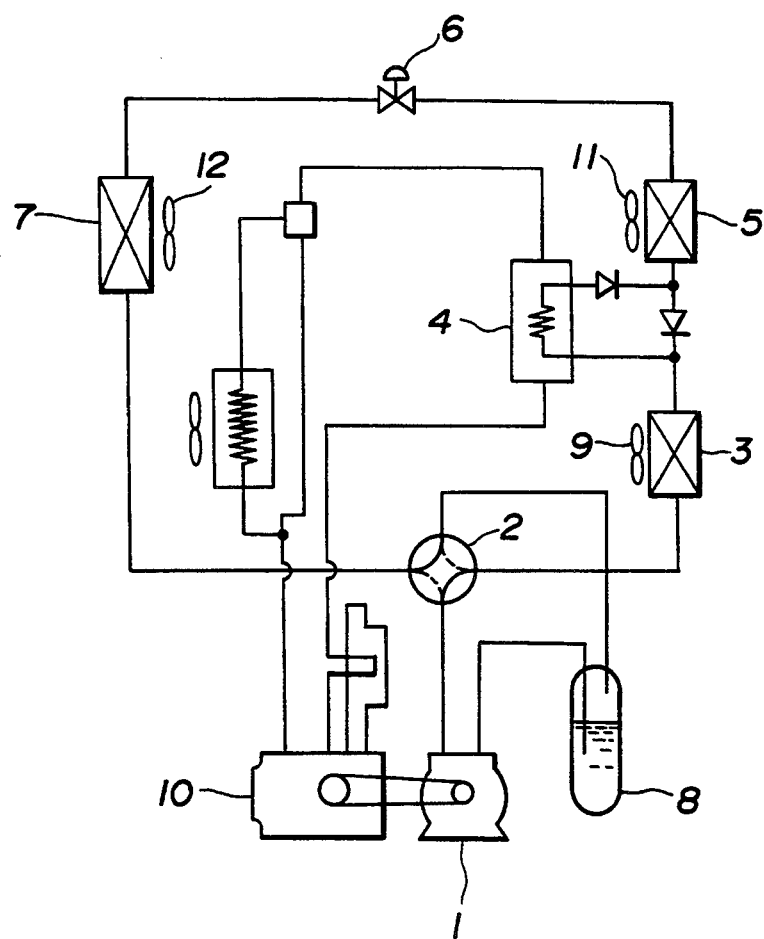
FIG. 11 is a schematic view of a conventional heat-pump type air conditioner.

In step S710, the target value $T_{suco}$ of the inlet air temperature $T_{suc}$ of the heat-absorbing inner heat exchanger 35 is renewed by applying the micro-change amount $\Delta T_{suc}$ calculated in the step S708, and then, the program proceeds to step S724 shown in FIG. 9.

The temperature control under the turned-on condition of the ambient air leading switch is implemented in the program from step S711 to step S723.

In step S711, it is judged whether the ambient temperature $T_{amb}$ is higher than the preset temperature $T_{set}1$ or not. When $T_{amb} \leq T_{set}1$, the program proceeds to a step S715. When $T_{amb} > T_{set}1$, the program proceeds to a step S712.

In step S712, the difference $\Delta\theta 2$ is between the outlet air temperature $T_{out}$ of the heat-absorbing inner heat exchanger 35 and the preset temperature $T_{set}2$. In step S713, the difference $\Delta\theta 2$ is compared with a predetermined valued S2. When $|\Delta\theta 2| > S2$, it is judged that the outlet air temperature $T_{out}$ is largely apart from the target value $T_{set}1$. Accordingly, the temperature control is implemented under the condition that the outlet air temperature $T_v$ is constant (along a $T_v$ constant line shown in FIG. 2), and the program proceeds to step S714 where $\Delta\theta 1$ is set to 0 ($\Delta\theta 1 = 0$) in order to further approach the outlet air temperature $T_{out}$ to the target value $T_{set}1$. Further, the program returns to the step S708. When $|\Delta\theta 2| \leq S2$, it is judged that the outlet air temperature Tout is adjusted within the target range. Accordingly, the program returns to step S708 in order to implement the temperature control while keeping $T_{out}$ constant which is shown in FIG. 2.

On the other hand, in step S715, a difference $\Delta\theta 2$ between the outlet air temperature $T_{out}$ of the heat-absorbing inner heat exchanger 35 and the preset temperature $T_{set}3$ is calculated. In a step S716, it is judged whether or not the inlet air temperature $T_{suc}$ of the heat-absorbing inner heat exchanger 35 is higher than a preset temperature $T_{set}4$. When the $T_{suc} > T_{set}4$, that is, when the inlet air temperature $T_{suc}$ of the heat-absorbing inner heat exchanger 35 is relatively high, the program proceeds to step S717 wherein the suction amount of the ambient air is increased since the temperature control can be stably implemented even if the suction of the ambient air is implemented.

When $T_{suc} \leq T_{set}4$, that is, when it is judged that the heat load of the air flowing to the heat-absorbing inner heat exchanger 35 is small, it can be expected to cause degrading of the heating capacity and the freezing of the heat-absorbing inner heat exchanger 35. Accordingly, the increase of the suction amount of the ambient air is forbidden, that is, the program jumps to a step S721 wherein the flag FLAG1 is set to 1 (FLAG1=1). Following this, in step S722, the micro-change amount $\Delta T_{suc}$ of the inlet air temperature $T_{suc}$ is set to 0 ($\Delta T_{suc}$=0) and the inlet air temperature $T_{suc}$ is kept on as it was.

In a step S717, it is judged as to whether it is time to turn on the ambient air leading switch or not. When the judgment in the step S717 is "YES", the program proceeds to a step S719 wherein the inlet air temperature $T_{suc}$ is lowered by the $\Delta T_{suc}$ relative to the target value to increase the suction amount of the inlet air. When the judgment in the step S717 is "NO", the program proceeds to step S718 wherein it is judged whether or not a predetermined time period $\Delta$Time has elapsed from the time when the target value of the inlet air temperature $T_{suc}$ was changed. When the judgment in the step S718 is "YES", the program proceeds to a step S719 wherein the flag FLAG1 is set to 0 (FLAG1=0). Following this, the program proceeds a step S720 wherein the micro-change amount of the inlet air temperature Tsuc is determined to $\Delta T_{set}5$. When the judgment in the step S718 is "NO", the program proceeds to a step S721 wherein the flag FLAG1 is set to 1 (FLAG1=1). Following this, in a step S722, the micro-change amount of the inlet air temperature $T_{suc}$ is set to 0 ($\Delta T_{set}$=0).

In the step S723, the micro-change amount $\Delta V_{comp}$ of the physical amount $V_{comp}$ is calculated by using the equation representative of the heating property. Since the target value of the inlet air temperature $T_{suc}$ of the heat-absorbing inner heat exchanger 35 is already obtained, the micro-change amount $\Delta V_{comp}$ is determined in such a manner that prevention of the freezing of the heat-absorbing inner heat exchanger 35 is prior to lowering of the outlet air temperature $T_v$ which is caused by the increase of the suction amount of the ambient air. Following this, the program returns to the step S709 wherein the target value $V_{compo}$ of the physical amount $V_{comp}$ is determined.

The control of the intake damper 11 is implemented in the program from step S725 to step S729.

In step S725, a difference $\Delta\theta 4$ between the inlet air temperature $T_{suc}$ of the heat-absorbing inner heat exchanger 35 and the target value $T_{suco}$, is calculated.

In a step S726, the difference $\Delta\theta 4$ is compared with a preset value S4. When $\Delta\theta 4 < -S4$, that is, when the inlet air temperature $T_{suc}$ is considerably lower than the target value $T_{suco}$, the program proceeds to a step S727 wherein the opening degree of the intake damper 42 is decreased by $\Delta X_{int}$ to reduce the suction amount of the ambient air in order to increase the inlet air temperature $T_{suc}$ of the heat-absorbing inner heat exchanger 35. When $\Delta\theta 4 > S4$, that is, when the inlet air temperature $T_{suc}$ of the heat-absorbing inner heat exchanger 35 is considerably higher than the target value $T_{suco}$, the program proceeds to step S729 wherein the opening degree of the intake damper 42 is increased by $\Delta X_{int}$ in order to decrease the inlet air temperature $T_{suc}$. Otherwise, that is, when $-S4 \leq \Delta\theta 4 \leq S4$, the program proceeds to step S728 wherein the opening degree of the intake damper 42 is maintained as it was.

In step S730, an applied voltage to the blower motor fan 44 is determined according to the target outlet air temperature $T_{of}$ calculated in step S703.

Control of the air mixing door 46 under a bi-level (B/L) mode is implemented in the program from step S731 to step S737.

In step S731, it is judged whether the bi-level mode is implemented or not. When the bi-level mode is implemented, the program proceeds to step 732 wherein a difference $\Delta\theta_v$ between a preset temperature $T_{set}6$ and a difference between the outlet air temperature $T_{out}$ of the heat-absorbing inner heat exchanger 35 and the outlet air temperature $T_v$ of the heat-radiating inner heat exchanger 33, is calculated. When the bi-level mode is not implemented, the program proceeds to step S737 wherein the opening degree of the air mixing door 46 is set to 100% so as to lead all air passing through the heat-absorbing inner heat exchanger 35 to the heat-radiating inner heat exchanger 33.

In step S733, the difference $\Delta\theta_v$ is compared with a preset value $S_v$. When $\Delta\theta_v < -S_v$, that is, it is judged that the difference between the upper and lower outlet air temperatures is small. Accordingly, the program proceeds to step S734 wherein the opening degree of the air mixing door 46 is decreased by $\Delta X_d$ so as to increase the difference $\Delta\theta_v$ by reducing the air flow rate flowed to the heat-radiating inner heat exchanger 33. When $\Delta\theta_v > S_v$, that is, when the difference $\Delta\theta_v$ is large, the program proceeds to a step S736 wherein the opening degree of the air mixing door 46 is increased by $\Delta X_d$ so as to decrease the difference $\Delta\theta_v$ by increasing the air flow rate passing through the heat-radiating inner heat exchanger 33. Otherwise, that is, when $-S_v \leq \Delta\theta_v \leq S_v$, the program proceeds to step S735 wherein the opening degree of the air mixing door 46 is kept on. Then, the program returns to step S702 and is repeated.

With the thus arranged air conditioner, it becomes possible to control the compressor 31 so as to keep on the outlet air temperatures $T_v$ and $T_{out}$ to a predetermined condition by properly determining the physical amount $V_{comp}$. Accordingly, the heating capacity of the air conditioner is stably improved without being affected by the ambient temperature.

Even if the ambient air leading switch is turned on, it becomes possible to gradually increase the suction amount of the ambient air so as to prevent lowering of the cooling capacity or freezing of the heat-absorbing inner heat exchanger 35 from being actualized, with reference to the inlet air temperature Tsuc of the heat-absorbing inner heat exchanger 35.

Accordingly, it becomes possible to realize both the suction of the ambient air and the amenity of passengers during the heating operation. Further, since the inlet air temperature $T_{suc}$ of the heat-absorbing inner heat exchanger 35 is variably controlled by control of the intake damper 42, it becomes possible to implement a proper temperature control even if the usable area of a compressor 31 is limited under a condition that the air conditioner is applied to an electric vehicle or that the vehicle is in a radical acceleration or in a slope climbing cruise.

While the preferred embodiment according to the present invention has been shown and described such that the intake damper 42 is controlled to variably control the inlet air temperature Tsuc of the heat-absorbing inner heat exchanger 35, it will be understood that a PTC heater may be applied as an external heat source.

In this case, it becomes possible that a PTC heater 71 is disposed upstream of the heat-absorbing inner heat exchanger 35 as shown in FIG. 1 and is variably controlled by the control unit 43. Such an arrangement is controlled according to a control flow chart shown in FIG. 10. The flow chart of FIG. 10 corresponds to the flow chart of FIG. 9, and other part of the control is the same as the control flow chart shown in FIGS. 7 and 8. Steps S1001, S1002, and S1003 are newly added in the flow chart of FIG. 10.

In step S1001, it is judged whether the difference $\Delta\theta1$ is larger than a preset value $\theta_{set}1$ or not. When the vehicle passenger changes the preset temperature $T_{ptc}$ to a higher value or when the suction amount of the ambient air is increased by running of the vehicle, the difference $\Delta\theta1$ becomes larger than the preset value $\theta_{set}1$ ($\Delta\theta1 > \theta_{set}1$). Then, the program proceeds to step S1002 wherein a predetermined input power is applied to the PTC heater 71. The input power applied to the PTC heater 71 is calculated by multiplying the constant $\alpha$ to the difference $\Delta\theta1$. Then, the program proceeds to a step S727 wherein the opening degree of the intake damper 42 is decreased by $\Delta X_{int}$. When the difference $\Delta\theta1$ is lower than or equal to the preset value $\theta_{set}1$ ($\Delta\theta1 \leq \theta_{set}1$), it is judged that the inlet air temperature $T_{suc}$ becomes the same as the target intake temperature $T_{suco}$ by a normal control in which the inlet air temperature Tsuc is controlled by the change of the opening degree of the intake damper 42. Then, the program proceeds to the step S1003 wherein the PTC heater 71 is turned off. Following this, the program jumps to step S725 and implements the intake damper control.

In this embodiment, the inlet air temperature $T_{suc}$ of the heat-absorbing inner heat exchanger 35 is aggressively controlled by the application of the PTC heater 71. Accordingly, both of the suction of the ambient air and the keeping of the passenger's amenity are effectively kept on, and it becomes possible to control the inlet air temperature $T_{suc}$ even if the vehicle is in a radical acceleration or in slope climbing.

It will be understood that exhaust heat from a main motor of an electric vehicle or from a storage heat source may be applied to an external heat source instead of the PTC heater.

Furthermore, the present invention may be applied to warming-up control or a normal air flow rate control. Although the preferred embodiment according to the present invention has been shown and described so as to be applied to an electric vehicle, it will be understood that this air-conditioner may be applied to that of an engine equipped vehicle.

What is claimed is:

1. A heat pump type air conditioner for an automotive vehicle, comprising:
   refrigerant;
   a compressor applying workload to said refrigerant, said compressor varying its workload according to a physical amount;
   an outer heat exchanger connected to a refrigerant discharge side of said compressor and radiating heat of said refrigerant into ambient air;
   a blower leading air for air-conditioning a passenger compartment of the automotive vehicle;
   a heat-radiating inner heat exchanger connected to the refrigerant discharge side of said compressor and transmitting the heat of said refrigerant to the air led by said blower;
   an expansion valve connected to a refrigerant outlet side of said heat radiating inner heat exchanger;
   a heat-absorbing inner heat exchanger connected to said expansion valve, said heat-absorbing inner heat exchanger cooling the air led by said blower by transmitting the heat of the air to said refrigerant which is supplied through said expansion valve from at least one of said outer heat exchanger and said heat-radiating inner heat exchanger;
   a switching device disposed among the refrigerant discharge side of said compressor, a refrigerant inlet side of said outer heat exchanger, and a refrigerant inlet side of said heat-radiating inner heat exchanger, said switching valve leading the refrigerant from said compressor to at least the outer heat exchanger during cooling operation and leading the refrigerant from said compressor to said heat-radiating inner heat exchanger while bypassing said outer heat exchanger during heating operation;
   means defining a heating property from relationship with the physical amount and thermal operating condition of at least one of said heat-radiating inner heat exchanger and said heat-absorbing inner heat exchanger;
   means for detecting the thermal operating condition; and
   means for determining the physical amount at a value from the relationship with said defined heating property and said detected thermal operating condition, and controlling said compressor according to said determined physical amount value.

2. A heat pump type air conditioner as claimed in claim 1, further comprising means for variably controlling an inlet air temperature of said heat-absorbing inner heat exchanger.

3. A heat pump type air conditioner as claimed in claim 2, further comprising second determining means for determining the physical amount such that the change of the thermal operating condition of said heat-radiating inner heat exchanger becomes about zero from the relationship with said defined heating property and said detected thermal operating condition, and controlling said compressor according to the physical amount determined by said second determining means when ambient air is led by said blower during heating operation.

4. A heat pump type air conditioner as claimed in claim 2, wherein said variably controlling means includes an external heat source.

5. A heat pump type air conditioner as claimed in claim 3, wherein said variably controlling means includes an external heat source.

6. A heat pump type air conditioner as claimed in claim 1, wherein said heating property defining means includes a control unit.

7. A heat pump type air conditioner as claimed in claim 1, wherein said thermal operating condition detecting means includes at least one of an outlet air temperature sensor of said heat-absorbing inner heat exchanger and an outlet air temperature sensor of said heat-radiating inner heat exchanger.

8. A heat pump type air conditioner as claimed in claim 1, wherein said physical amount determining means includes a control unit.

9. A heat pump type air conditioner as claimed in claim 1, wherein said second determining means includes a control unit.

10. A heat pump type air conditioner as claimed in claim 1, further comprising a one-way valve which is disposed between said outer heat exchanger and said heat-radiating inner heat exchanger and which valve allows said refrigerant to flow from said outer heat exchanger to said heat-radiating inner heat exchanger.

11. A heat pump type air conditioner for an automotive vehicle, said heat pump type air conditioner having a three-way valve which fluidly and directly communicates a compressor and an outer condenser during cooling operation and fluidly and directly communicates the compressor and an inner condenser during heating operation, the inner condenser being connected to an evaporator through an expansion valve, said air conditioner comprising:

means defining a relationship among a heating property, thermal operating condition of at least one of the inner condenser and the evaporator, and physical amount whose change applies to change of the workload of said compressor;

means for detecting the thermal operating condition of at least one of the inner condenser and the evaporator;

means for determining the physical amount according to the defined relationship and the detected thermal operation condition; and means for controlling said compressor according to the determined physical amount.

* * * * *